(12) United States Patent
Ruiz et al.

(10) Patent No.: US 8,770,532 B2
(45) Date of Patent: Jul. 8, 2014

(54) CABLE RETAINING RING HAVING SLIDE CLOSURE AND CABLE SUPPORT TRAY INCLUDING THE CABLE RETAINING RING

(75) Inventors: Gil Ruiz, McKinney, TX (US); Jony Liu, Jiangsu (CN)

(73) Assignee: CommScope, Inc. of North Carolina, Hickory, NC (US)

( * ) Notice: Subject to any disclaimer, the term of this patent is extended or adjusted under 35 U.S.C. 154(b) by 16 days.

(21) Appl. No.: 13/468,108

(22) Filed: May 10, 2012

(65) Prior Publication Data

US 2012/0286106 A1 Nov. 15, 2012

Related U.S. Application Data

(60) Provisional application No. 61/485,698, filed on May 13, 2011.

(51) Int. Cl.
*F16B 45/00* (2006.01)

(52) U.S. Cl.
USPC ............ 248/307; 248/68.1; 248/221.11; 24/374; 24/598.3

(58) Field of Classification Search
USPC ............ 248/49, 305, 307, 68.1, 74.4, 74.1, 248/221.11, 222.11, 223.31, 316.6, 223.41; 59/84, 85; 24/600.4, 601.6, 16 PB, 24/17 PB
See application file for complete search history.

(56) References Cited

U.S. PATENT DOCUMENTS

| | | | | |
|---|---|---|---|---|
| 320,792 | A * | 6/1885 | Jopson | 70/459 |
| 2,989,862 | A * | 6/1961 | Segal | 70/459 |
| 4,609,171 | A | 9/1986 | Matsui | |
| 4,887,324 | A * | 12/1989 | Cairns | 4/609 |
| D315,865 | S * | 4/1991 | Fisscher | D8/395 |
| D318,123 | S | 7/1991 | Yokoyama | |
| 5,109,576 | A * | 5/1992 | Teekell et al. | 24/30.5 R |
| 5,380,326 | A * | 1/1995 | Lin | 606/330 |
| 5,860,681 | A * | 1/1999 | Slais | 285/137.11 |
| 6,250,816 | B1 | 6/2001 | Johnston | |
| 6,298,526 | B1 * | 10/2001 | Baumdicker et al. | 24/559 |
| 6,510,274 | B1 | 1/2003 | Wu | |
| D476,218 | S * | 6/2003 | Kelleghan | D8/356 |
| 7,068,907 | B2 | 6/2006 | Schray | |
| 7,107,941 | B2 * | 9/2006 | Wang | 119/865 |
| D607,617 | S * | 1/2010 | Golenz et al. | D30/152 |
| 7,825,337 | B2 | 11/2010 | Young | |
| 8,322,003 | B2 * | 12/2012 | Petzl et al. | 24/598.8 |
| 2002/0074149 | A1 * | 6/2002 | Lawrence et al. | 174/72 A |
| 2006/0162948 | A1 | 7/2006 | Rinderer | |
| 2007/0221793 | A1 | 9/2007 | Kusuda | |
| 2009/0283645 | A1 | 11/2009 | Nikayin | |
| 2010/0220968 | A1 | 9/2010 | Dagley | |

* cited by examiner

*Primary Examiner* — Terrell McKinnon
*Assistant Examiner* — Daniel J Breslin
(74) *Attorney, Agent, or Firm* — Muncy, Geissler Olds & Lowe, P.C.

(57) ABSTRACT

A cable retaining ring includes a base having at least one mounting opening or at least one mounting projection for connecting the cable retaining ring to a cable support tray, an elongate interior defining a cable retention region, a gap through the ring for allowing a cable to be placed into or removed from the interior, and a slide mounted on the ring and shiftable between a first position substantially blocking the gap to prevent the cable from being placed into or removed from the interior and a second position unblocking the gap.

17 Claims, 6 Drawing Sheets

CABLE RETAINING RING HAVING SLIDE CLOSURE AND CABLE SUPPORT TRAY INCLUDING THE CABLE RETAINING RING

CROSS-REFERENCE TO RELATED APPLICATIONS

The present application claims the benefit of U.S. Provisional Patent Application No. 61/485,698, filed May 13, 2011, the entire contents of which are hereby incorporated by reference.

FIELD OF THE INVENTION

The present invention is directed to a cable retaining ring having a sliding closure element and toward a cable support tray including the ring, and, more specifically, toward an elongate cable retaining ring having a gap and a slide for selectively blocking the gap and toward a cable support tray including the ring.

BACKGROUND OF THE INVENTION

Data centers, telecommunication facilities and other locations may include numerous optical or electronic devices stacked in racks. Many of these devices include jacks for receiving optical or electrical connectors at the ends of optical or electrical cables, and a large number of such cables may be connected to the equipment on a given shelf or rack. To help organize and support these cables, projecting troughs may be provided near the location where the cables connect to the devices. It is known to provide a plurality of fiber retainer rings on the troughs which surround one or more cables to retain and guide the cables.

The rings generally include a flexible portion that can be pushed or pulled to temporarily open a gap in the ring through which cables can be inserted into the ring. It may require a moderate amount of force to flex conventional rings into a cable-receiving configuration, and the rings may lose flexibility over time leaving a small gap where before two portions of the ring met securely. It may be possible to insert a cable into a ring by pressing the cable against the flexible ring portion to simultaneously open the gap and insert the cable. However, removing cables from such a ring requires a worker to displace the flexible portion of the ring with one hand and hold open the gap while removing the one or more cables with his other hand. It would be desirable to provide a cable retaining ring that can be opened and closed with one hand and which retains its closed shape even after a gap therein is opened and closed numerous times.

SUMMARY OF THE INVENTION

These problems and others are addressed by embodiments of the present invention, a first aspect of which comprises a cable retaining ring that includes a base having at least one mounting opening or at least one mounting projection for connecting the cable retaining ring to a cable support tray. The ring has an elongate interior defining a cable retention region, a gap through the ring for allowing a cable to be placed into or removed from the interior, and a slide mounted on the ring. The slide is shiftable between a first position substantially blocking the gap to prevent the cable from being placed into or removed from the interior and a second position unblocking the gap.

Another aspect of the invention comprises a cable support tray that includes a body portion configured to support at least one electronic or optical or telecommunications module, a cable support trough at one end of the body, and at least one cable retaining ring mounted on the cable support trough. The at least one cable retaining ring includes an elongate interior defining a cable retention region, a gap through the ring for allowing a cable to be placed into or removed from the interior, and a slide mounted on the ring. The slide is shiftable between a first position substantially blocking the gap to prevent the cable from being placed into or removed from the interior and a second position unblocking the gap.

A further aspect of the invention comprises a cable retaining ring including a base having mounting means for mounting the cable retaining ring to a cable support tray, an elongate interior defining a cable retention region, a gap through the ring for allowing a cable to be placed into or removed from the interior and closure means for selectively closing the gap.

BRIEF DESCRIPTION OF THE DRAWINGS

These and other aspects and features of the present invention will be better understood after a reading of the following detailed description together with the attached drawings wherein.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
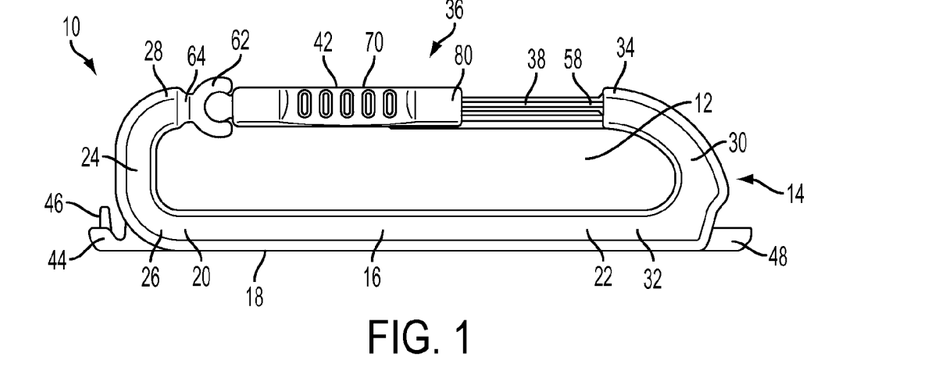
FIG. 1 is a side elevational view of a retaining ring having a slide closure according to a first embodiment of the present invention with the slide in a closed position.
Figure 2:
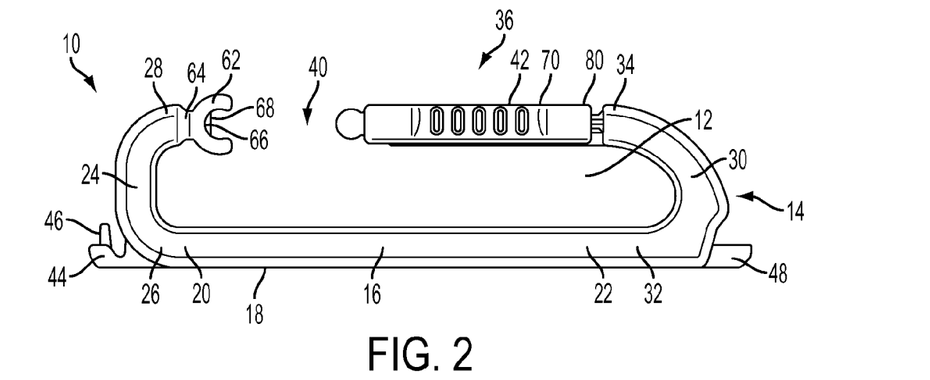
FIG. 2 is a side elevational view of the retaining ring of FIG. 1 with the slide in an open position.
Figure 3:
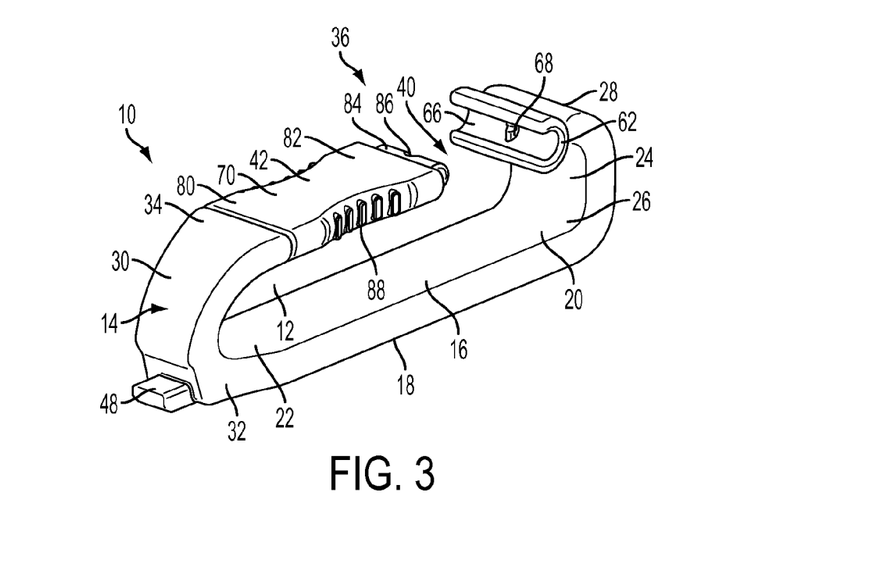
FIG. 3 is a perspective view of the retaining ring of FIG. 2.

FIGS. 1-3 illustrate a cable retaining ring 10 having an elongate interior 12 and an outer periphery designated generally by the numeral 14. The ring 10 has a base 16 that is linear and a generally flat bottom surface 18 for mounting on a flat mounting surface 19, illustrated in FIG. 9 and described hereinafter, and the base 16 has a first end 20 and a second end 22. The ring also includes a first, generally C-shaped side 24 having a first end 26 connected to the first end 20 of the base 16 and a second end 28, and a second, generally U-shaped side 30 having a first end 32 connected to the second end 22 of the base and a second end 34. The portion of the ring 10 referred to herein as the top 36 of the ring is located between the second end 28 of the ring first side 24 and the second end 34 of the ring second side 30 and includes a guide 38, a gap 40 and a slide 42 mounted on the guide 38 for selectively opening and closing the gap 40. A first hooked tab 44 projects from the first side 24, generally in the plane of the flat bottom surface 18 of the base 16 and has an upstanding boss 46 pointing toward the plane of the top 36, and a second, generally linear tab 48 projects from the second side 30, also generally in the plane of the flat bottom surface 18 of the base 16. The first and second tabs 44, 48 act as mounting projections and are used to secure the ring 10 to the mounting surface 19 without the need for tools.

Figure 4:
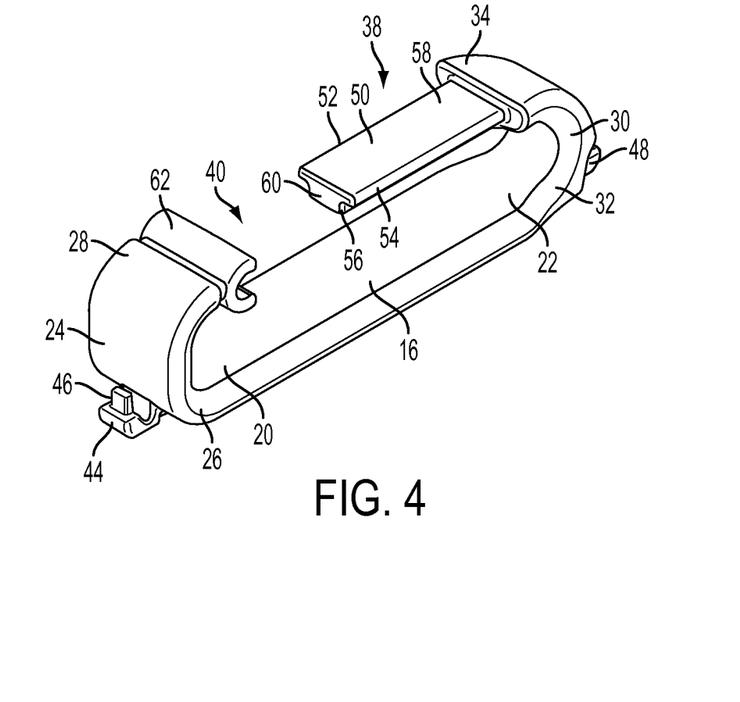
FIG. 4 is a perspective view of the retaining ring of FIG. 1 with the slide removed.

The guide 38, visible in FIG. 4 with the slide 42 removed, has a generally T-shaped cross section perpendicular to its width with a top 50 having a first edge 52 and a second, parallel, edge 54 and a leg 56 depending from the top 50 between the first edge 52 and the second edge 54. The guide 38 has a first end 58 connected to the second end 34 of the second side 30 and a free end 60 facing the second end 28 of the ring first side 24 and spaced therefrom by the gap 40. The width of the guide 38 between the first edge 52 and the second edge 54 is somewhat less than the width of the second end 34 of the second side 30 where it connects to the first end 58 of the guide 38. A retainer, such as receiver 62, is connected to the second end 28 of the first side 24 and comprises a base 64 connected to the second end 28 of the first side 24 and a first connector element, such as an open, generally C-shaped channel 66 facing the free end 60 of the guide 38. The channel 66 includes a central wall 68, best seen in FIG. 3, perpendicular to the length of the channel 66.

Figure 5:
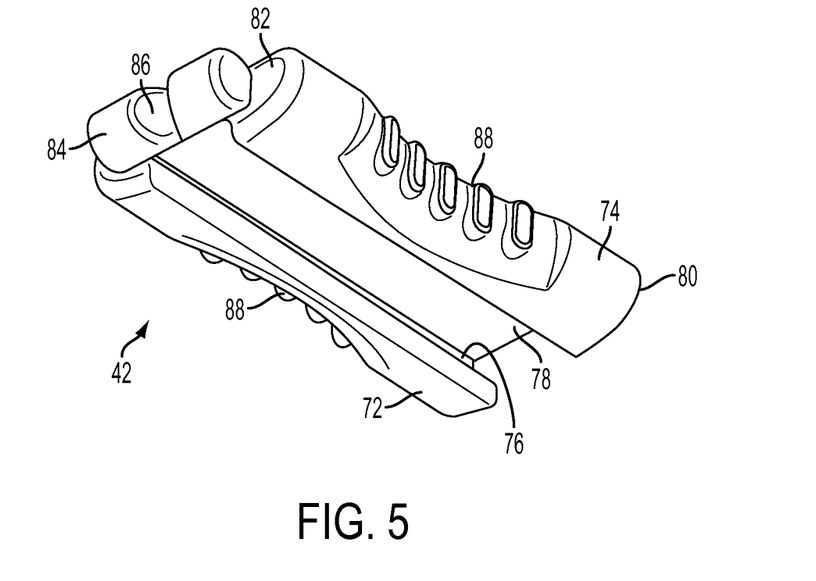
FIG. 5 is a bottom perspective view of the slide of FIG. 1.

The slide 42, illustrated by itself in FIG. 5, includes a top 70 and spaced, first and second inwardly curving arms 72, 74, each defining, with the top 70, first and second slots 76, 78, for receiving the first and second ends or edges 52, 54 of the top 50 of the guide 38 to allow the slide 42 to slide back and forth along the guide 42. The slide 42 includes a first end 80 and a second end 82, and the second end 82 includes a second connector element, such as a generally cylindrical connector element 84 having a central notch 86. The first and second inwardly curving arms 72, 74 may include oppositely facing concavities 88 to facilitate gripping of the slide 42 by a user's fingers. The cylindrical connector element 84 has a diameter slightly greater than a width of the opening into the channel 66 of the receiver 62.

Figure 10:
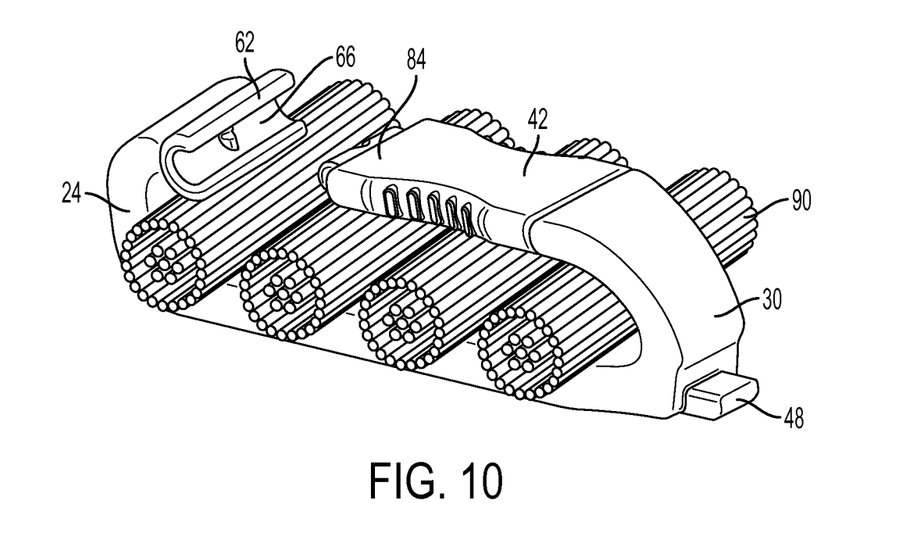
FIG. 10 is a perspective view of the retaining ring of FIG. 1 holding a plurality of cables.

In use, the slide 42 is movable between a first position, illustrated in FIG. 1, with the first end 80 of the slide 42 spaced from the second end 34 of the second side 30, in which position the slide 42 substantially blocks the gap 40, and a second position, illustrated in FIGS. 2 and 3, with the first end 80 of the slide 42 adjacent the second end 34 of the second side 30 in which position the gap 40 into the interior 12 of the ring 10 is open. In the first position, the cylindrical connector element 84 at the second end 82 of the slide 42 is located in the channel 66 of the receiver 62, and the first end 80 of the slide 42 is spaced from the second end 34 of the second side 30. Because the cylindrical connector element 84 has a greater width than the opening into the channel 66, force must be used to snap the connector element 84 into the channel 66 and this snap fit or friction fit between the cylindrical connector element 84 and the channel 66 helps hold the slide 42 in the first or closed position. In this position, the central wall 68 in the channel 66 extends into the central notch 86 of the cylindrical connector element 84 to help ensure that the slide 42 is centered and to help resist movement of the cylindrical connector element 84 in a direction perpendicular to the sliding direction. Cables 90, illustrated in FIG. 10, can be placed into the interior 12 through the gap 40 when the slide 42 is in the second position and retained in the interior 12 when the slide 42 is in the first position.

Figure 9:
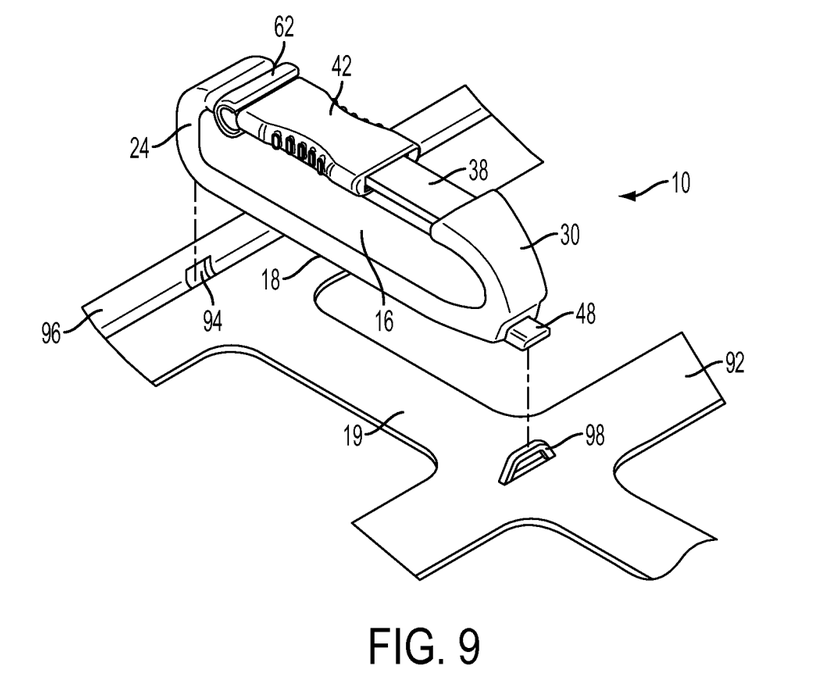
FIG. 9 is an exploded perspective view of the retaining ring of FIG. 1 adjacent to a support tray.

FIG. 9 illustrates the ring 10 being mounted to the mounting surface 19. The mounting surface 19, which may comprise a portion of a cable support tray 92, illustrated in FIG. 11, includes a hole 94 in an upstanding wall 96 and a loop 98 spaced from the hole 94 by a distance approximately equal to the length of the base 16. To mount the ring 10 to the mounting surface 19, the second tab 48 on the second side 30 of the ring 10 is inserted into the loop 98 while the first tab 44 is pressed downwardly along the upstanding wall 96 toward the hole 94 until the first tab 44 enters the hole 94 and the boss 46 snaps into place on a side of the wall opposite from the ring 10. The flexibility of the first and second tabs 44, 48 and the boss 46 allows for this tool-less installation, and the ring 10 can be flexed sufficiently to allow its removal from the mounting surface 19 in a similar manner.

Figure 6:
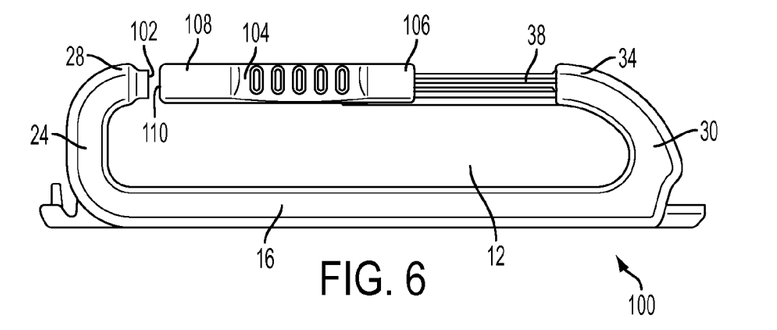
FIG. 6 is a side elevational view of a retaining ring according to a second embodiment of the invention.

FIG. 6 illustrates a cable retaining ring 100 according to a second embodiment of the present invention in which elements common to the first embodiment are identified with like reference numerals. The first side 24 of the ring 100 has a second end 28 that ends in a first connector element, such as a flat surface 102 rather than the receiver of the first embodiment. The retainer ring 100 further includes a slide 104 having a first end 106 facing the second end 34 of the second side 30 and a second end 108 that ends in a second connector element, such as a flat surface 110. The slide 104 moves between a first position with the slide second end 108 in contact with or closely spaced from the flat surface 102 of the second end 28 of the first side 24, substantially blocking the gap 40, and a second position with the first end 106 of the slide 104 close to the second end 34 of the second side 30, leaving the gap 40 open for the insertion or removal of cables 90. The slide 104 of this embodiment does not include mechanical fasteners for making a connection with the second end 28 of the first side 24. Instead, the slide 104 and/or the guide 38 are provided with detents (not illustrated) for frictionally holding the slide 104 in one of a number of predetermined positions relative to the guide 38, or, alternately, the shape and size of the first and second arms 72, 74 of the slide 104 and the shape of the first and second edges 52, 54 of the T-shaped guide 38 are configured for a tight fit so that the slide 104 is frictionally retained on the guide 38 in whatever position it is placed by a user, a relatively large amount of force being required to move the slide 104 along the guide 38. "Relatively large" in this context is intended to mean more force than would be needed to move a freely sliding slide 42, but still a small enough amount of force that a user can readily slide the slide 42 to a desired position with a finger and thumb. This arrangement does not include a mechanical interconnection between the slide 104 and the first side 24 of the ring 10, but the lack of complementary connector elements may lead to lower manufacturing costs in some cases.

Figure 7:
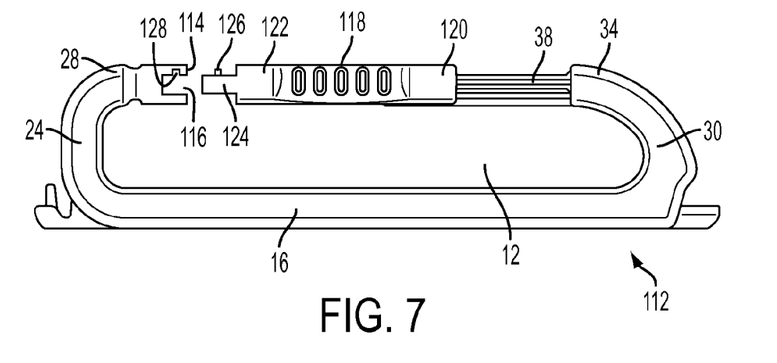
FIG. 7 is a side elevational view of a retaining ring according to a third embodiment of the invention.

FIG. 7 illustrates a cable retaining ring 112 according to a third embodiment of the present invention in which elements common to the first and second embodiments are identified with like reference numerals. In this embodiment, the first side 24 of the ring 10 has a second end 28 that ends in a first connector element, such as a slotted surface 114 having a groove 116 facing the free end 60 of the guide 38 and disposed in a plane generally parallel to the base 16. The retaining ring 112 includes a slide 118 having a first end 120 facing the second end 34 of the second side 30 and a second end 122 that ends in a second connector element, such as a projecting tongue 124 sized to be received in the groove 116 and be retained therein with a friction fit or with an optional detent 126 receivable within a dimple 128 inside the groove 116 to snap into place. The slide 118 moves between a first position with the tongue 124 in the groove 116, holding the slide 118 in the first position substantially blocking the gap 40 and a second position with the first end 120 close to or contacting the second end 34 of the second side 30 leaving the gap 40 open for receiving or removing the cables 90.

Figure 8:
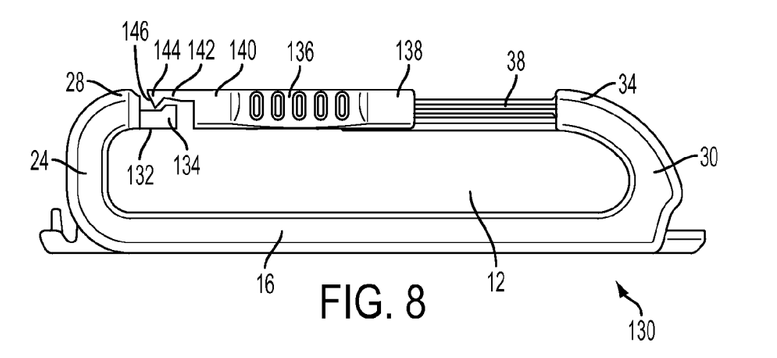
FIG. 8 is a side elevational view of a retaining ring according to a fourth embodiment of the invention.

FIG. 8 illustrates a cable retaining ring 130 according to a fourth embodiment of the present invention in which elements common to the first through third embodiments are identified with like reference numerals. In this embodiment, the second end 28 of the first side 24 of the ring 130 has a first connector element, such as a projecting shelf 132 having a raised ridge 134 projecting away from the base 16 and spaced from the second end 28, and the retaining ring 130 further includes a slide 136 having a first end 138 facing the second end 34 of the second side 30 and a second end 140 having a second connector element, such as a projecting shelf 142 with a depending ridge 144 facing in the direction of the base 16 and including an angled distal face 146. In use, the second end 140 of the slide 136 is moved toward the second end 28 of the ring first side 24 until the angled distal face 146 engages the raised ridge 134. Continued sliding force on the slide 136 cams the projecting shelf 142 of the slide 136 over the raised ridge 134 until the depending ridge 144 passes over the raised ridge 134 to frictionally hold the slide 136 in place relative to the second end 28 of the first side 28. A similar degree of force is required to shift the slide 136 toward the second end 34 of the second side 30 to reopen the gap 40. Other complementary connector structures could be provided on second end 28 of the first side 24 and on an end of a slide for temporarily holding a slide in a position substantially blocking the gap 40 without exceeding the scope of the present invention.

Figure 12:
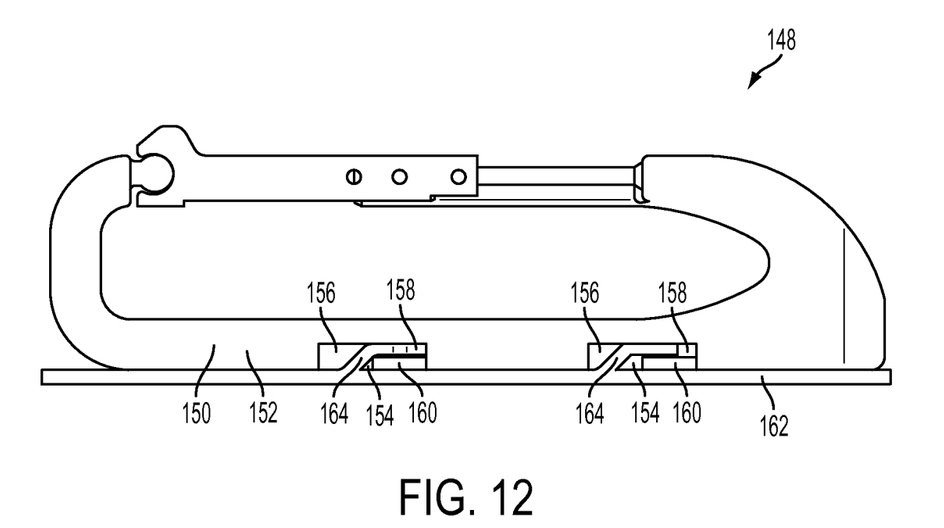
FIG. 12 is a side elevational view of a retaining ring according to another embodiment of the invention.

FIG. 12 illustrates a retaining ring 148 according to a fifth embodiment of the present invention in which elements common to the first through fourth embodiments are identified with like reference numerals. The retaining ring 148 is substantially identical to the retaining ring 10 of the first embodiment except for the structures of the base and the elements for connecting the retaining ring 148 to a support surface. The retaining ring 148 includes a base 150 having a bottom surface 152 and at least one mounting opening, such as first and second transverse slots 154, each of which includes a first portion 156 that extends through the bottom surface 152 and a second portion 158 that is spaced from the bottom surface 152 by a lip 160. The mounting surface 162 includes first and second tabs 164 that are generally parallel to the plane of the mounting surface 162 and spaced from the plane of the mounting surface 162 by a distance approximately equal to a thickness of the lips 160. To mount the retaining ring 148 on the mounting surface 162, the retaining ring 148 is placed on the mounting surface 162 with the first and second transverse slots 154 next to the first and second tabs 164 and moved toward the first and second tabs 164 until the first and second tabs 164 are received in the first and second transverse slots 154 with the tabs 164 projecting into the second portions 158 of the slots 154 and overlying the lips 160 to frictionally engage and retain the retaining ring 148 in a mounting location.

Figure 11:
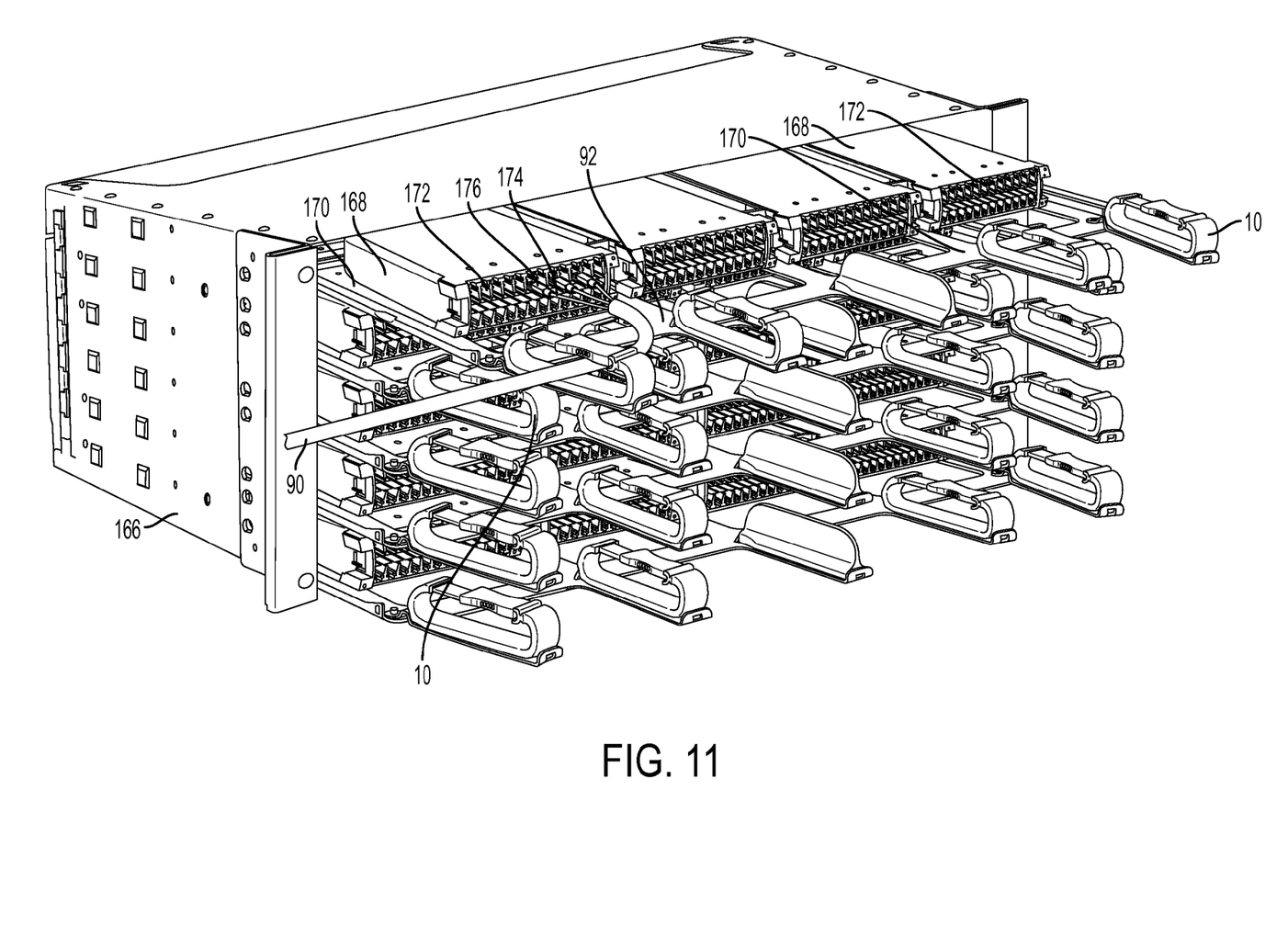
FIG. 11 is a perspective view of a plurality of cable support trays supporting optical telecommunications modules, the cable support trays including cable support troughs with retainers of the present invention mounted thereon.

FIG. 11 illustrates a housing 166 supporting a plurality of sliding trays 92 each of which supports four optical modules 168 with a plurality of jacks 172. Each of the sliding trays 92 includes a cable support trough 170 projecting therefrom, and each of the cable support troughs includes a plurality of cable retaining rings 10. Cable retaining rings according to the other embodiments of the invention could also be used in place of the cable retaining rings 10. Cables 90 approach the housing 166 from above or below or from one side and are retained in the retaining rings 10 and can be removed from and inserted into the cable retaining rings 10 as described above. Individual fibers 174 having connectors 176 emerge from the cables 90 and are connected to various ones of the jacks 172. While only one cable 90 and three individual fibers 174 are illustrated, in use multiple cables and fibers would be present and a majority of the jacks 172 would have connectors 176 mounted therein.

The present invention has been described herein in terms of several presently preferred embodiments. However, modifications and additions to these embodiments will become apparent to those of ordinary skill in the art upon a reading of the foregoing description. It is intended that all such modifications and additions comprise a part of the present invention to the extent they fall within the scope of the several claims appended hereto.

What is claimed is:

1. An apparatus comprising:
   a cable retaining ring including:
   a base having at least one mounting opening or at least one mounting projection for connecting said cable retaining ring to a cable support tray;
   an interior defining a cable retention region;
   a gap through said cable retaining ring for allowing a cable to be placed into or removed from said interior; and
   a slide mounted on said cable retaining ring and shiftable between a first position substantially blocking said gap to prevent the cable from being placed into or removed from said interior and a second position unblocking said gap, wherein a portion of said cable retaining ring at a first side of said gap presents a guide, wherein a portion of said cable retaining ring at a second side of said gap presents a first connector element wherein said slide is slidably retained on said guide, wherein said slide includes an end having a second connector element configured to engage said first connector element, and wherein said first and second connector elements are held together by a retaining force created by at least one of a snap fit and friction to thereby hold said slide in said first position.

2. The apparatus of claim 1, including a top spaced from said base and connected to said base by first and second sides, wherein said gap and said guide are located in said top.

3. The apparatus of claim 2, wherein said first side includes said first connector element.

4. The apparatus of claim 1, wherein said first connector element and said second connector element are configured to join in a snap fit.

5. The apparatus of claim 1, wherein said first connector element is configured to frictionally retain said second connector element or be frictionally retained by said second connector element.

6. The apparatus of claim 1, wherein said slide slides in a sliding direction and wherein said first connector element or said second connector element comprises a cylinder having a longitudinal axis perpendicular to said sliding direction.

7. The apparatus of claim 1, wherein said first connector element is complementary to said second connector element.

8. The apparatus of claim 1, wherein said cable retaining ring includes an outer periphery and wherein said at least one mounting opening or at least one mounting projection comprises a first mounting projection projecting from said periphery at said base in a first direction and a second mounting projection projecting from said periphery at said base in a second direction opposite said first direction.

9. The apparatus of claim 1, wherein said guide has first and second edges, and wherein said slide includes first and second spaced arms slidably engaging said first and second edges of said guide.

10. The apparatus of claim 1, further comprising:
    a plurality of cables passing through said interior defining said cable retention region.

11. The apparatus of claim 9, wherein said first and second spaced arms of said slide have convex central portions.

12. The apparatus of claim 1, further comprising:
    a cable support tray including:
    a body portion configured to support at least one electronic or optical or telecommunications module; and
    a cable support trough at one end of said body, wherein said cable retaining ring is mounted on said cable support trough.

13. The apparatus of claim 12, including at least one electronic or optical or telecommunications module mounted on said body portion.

14. The apparatus of claim 13, including a plurality of cables connected to said at least one electronic or optical or telecommunications module, said plurality of cables extending through the interior of said cable retaining ring.

15. The apparatus of claim 12, wherein said trough includes first and second spaced openings and wherein said cable retaining ring includes first and second projections received in said first and second spaced openings to secure said cable retaining ring to said trough.

16. An apparatus comprising:
    a cable retaining ring including:
    a base having at least one mounting opening or at least one mounting projection for connecting the cable retaining ring to a cable support tray;
    an elongate interior defining a cable retention region;
    a gap through the ring for allowing a cable to be placed into or removed from the interior; and
    a slide mounted on the ring and shiftable between a first position substantially blocking said gap to prevent the cable from being placed into or removed from the interior and a second position unblocking the gap, and said cable retaining ring further including:
    a top spaced from said base and including said gap, wherein said top includes a guide having a T-shaped cross section and said slide comprises first and second arms slidably engaging first and second ends of a top of the guide.

17. An apparatus comprising:
    a cable retaining ring including:
    a base having mounting means for mounting said cable retaining ring to a cable support tray;
    an interior defining a cable retention region;
    a gap through said cable retaining ring for allowing a cable to be placed into or removed from the interior; and
    a slide for selectively closing said gap, wherein a portion of said cable retaining ring at a first side of said gap presents a guide having first and second edges, wherein a portion of said cable retaining ring at a second side of said gap presents a first connector element, wherein said slide is slidably retained on said guide, wherein said slide includes first and second spaced arms slidably engaging said first and second edges of said guide, wherein said slide includes an end having a second connector element configured to engage said first connector element, and wherein said first and second connector elements are held together by a retaining force created by at least one of a snap fit and friction to thereby hold said slide in a position closing said gap.

* * * * *